W. D. DORSEY.
Wheel-Cultivator.
No. 38,295.
Patented Apr. 28, 1863.
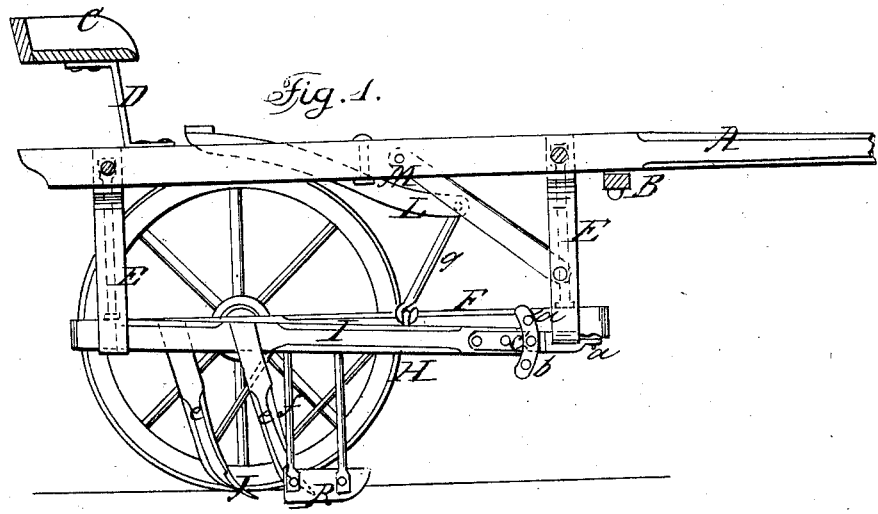
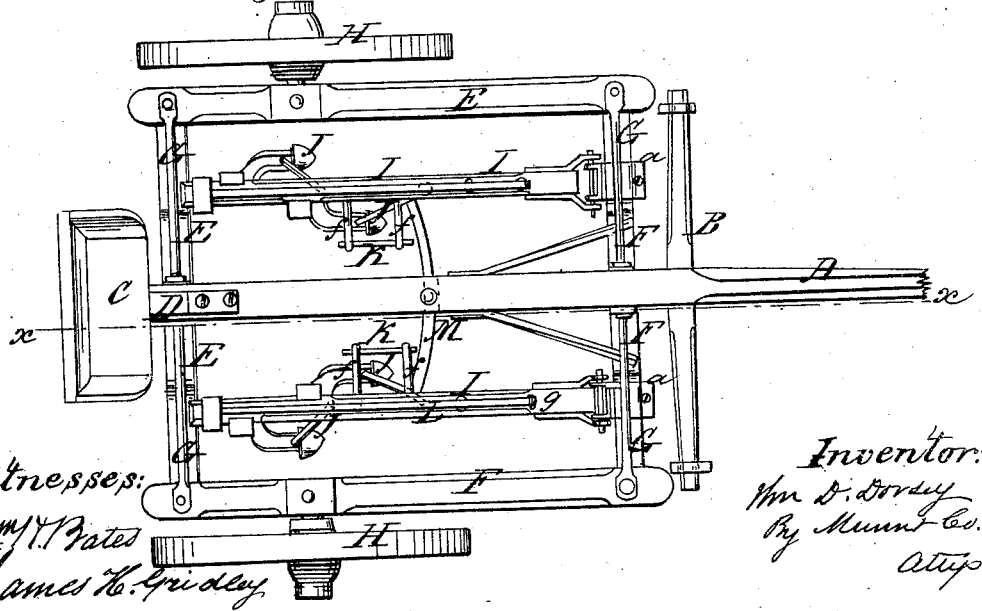

UNITED STATES PATENT OFFICE.

WILLIAM D. DORSEY, OF DECATUR, ILLINOIS.

IMPROVEMENT IN CULTIVATORS.

Specification forming part of Letters Patent No. 38,295, dated April 28, 1863.

*To all whom it may concern:*

Be it known that I, WILLIAM D. DORSEY, of Decatur, in the county of Macon and State of Illinois, have invented a new and Improved Corn-Cultivator; and I do hereby declare that the following is a full, clear, and exact description of the same, reference being had to the annexed drawings, making a part of this specification, in which—

Figure 1 is a side sectional view of my invention, taken in the line $x$ $x$, Fig. 2; Fig. 2, a plan or top view of the same.

Similar letters of reference indicate corresponding parts in the two figures.

To enable those skilled in the art to fully understand and construct my invention, I will proceed to describe it.

A represents the draft-pole of the machine, and B the double-tree attached thereto at its under side.

C is the driver's seat, which is supported by an elastic bar, D, secured to the back part of the draft-pole.

To each side of the draft-pole A there are secured two bent bars, E E, to which longitudinal strips F are attached, said strips forming the side pieces of the frame of the machine. The bars E E and strips F F are braced by rods G, the upper ends of which are secured to the upper ends of the bent bars, the bolts passing into the draft-pole, the lower ends of said rods being bolted to the strips F and also to the lower ends of E. The rods G stiffen the whole frame, which is mounted on wheels H H, the arms or axles of which are attached to the strips F near their back ends.

On the lower and horizontal part of each front bar E there is fitted a socket, $a$. To these sockets the front ends of share-frames I are connected by joints $b$, which are formed by pins or bolts $c$ passing through segmental clevises $d$, attached to the share-frames and through eyes attached to the sockets $a$. The segmental clevises $d$ have a plurality of holes made through them, through any of which the pins or bolts $c$ may pass, according to the depth it is desired to have the shares or teeth penetrate the earth.

Each share-frame has two feet or standards, $e$ $e$, attached near its back end, and to each foot or standard there is secured a share or tooth, J. The front shares or teeth, J, are rather nearer together than the back ones, as will be understood by referring to Fig. 2, and by the inner side of each front share or tooth there is a fender or guard, K. These fenders or guards are simply metal plates attached to the lower ends of rods $f$, the upper ends of which are secured to the share-frames I.

L L are two levers, the fulcra of which are at the ends of a bar, M, secured to the draft-pole. There is a lever, L, at each side of the draft-pole A, and the front ends of these levers are connected by links $g$ to the share-frames I. The levers L L extend back sufficiently far to admit of being readily operated upon by the foot of the driver. Each share-frame being elevated at its lever L is depressed at its back end. The front shares or teeth, J, as they work quite near the plants, would be liable to cast dirt upon them were it not for the guards or fenders K. These guards or fenders effectually prevent such a contingency.

From the above description it will be seen that the driver on his seat C is not required to use his hands at all in order to operate the share-frames I, the feet of the driver being only required for the purpose. The driver therefore can manage his team equally as well as if they were before an ordinary vehicle. The back ends of the share-frames I, when down, rest on the back bent bars E. The whole arrangement is extremely simple and efficient and admits of being very economically constructed.

Having thus described my invention, what I claim as new, and desire to secure by Letters Patent, is—

The arrangement, in the manner herein shown and described, of the two adjustable share-frames I I and the operating foot-levers L L with each other, and with the bars E E, the pole A, and the driver's seat C, all as set forth.

W. D. DORSEY.

Witnesses:
JOHN GROSS,
WM. FUNK.